United States Patent
Chien

Patent Number: 5,836,671
Date of Patent: Nov. 17, 1998

[54] BACKPACK OR WAISTPACK E.L. LIGHTING ARRANGEMENT

[76] Inventor: Tseng Lu Chien, SP, No. 29, Alley 73, Lin-Shen Street, Shi-Chi Town, Taipei, Hseng, Taiwan

[21] Appl. No.: 617,969

[22] Filed: Mar. 11, 1996

Related U.S. Application Data

[63] Continuation of Ser. No. 343,915, Nov. 17, 1994, abandoned.

[51] Int. Cl.⁶ ............................................. F21L 15/08
[52] U.S. Cl. ......................... 362/84; 362/103; 362/108
[58] Field of Search ................................. 362/84, 108, 103, 362/156, 155, 253, 257, 189, 105; 40/544, 580, 581

[56] References Cited

U.S. PATENT DOCUMENTS

| | | | |
|---|---|---|---|
| 3,153,745 | 10/1964 | Gurian et al. | 362/84 X |
| 5,067,063 | 11/1991 | Granneman et al. | 362/84 X |
| 5,151,678 | 9/1992 | Veltri et al. | 362/103 X |
| 5,245,516 | 9/1993 | de Haas et al. | 362/84 X |
| 5,245,517 | 9/1993 | Fenton | 362/84 X |
| 5,270,909 | 12/1993 | Weiss et al. | 362/399 X |
| 5,424,922 | 6/1995 | Wise | 362/108 X |

FOREIGN PATENT DOCUMENTS

| | | | |
|---|---|---|---|
| 4101595 | 7/1992 | Germany | 362/108 |

Primary Examiner—Thomas M. Sember
Attorney, Agent, or Firm—Bacon & Thomas

[57] ABSTRACT

A lighting arrangement for a backpack or waistpack includes an electro-luminescent strip, a power supply, and control device made up of a DC/AC converter electrically connected with the power supply, a transformer electrically connected with the DC/AC converter, a function interface electrically connected with the transformer, and a switch electrically connected between the transformer and the electro-luminescent light strip. The electro-luminescent light strip may be in the form of a multi-element light panel, permitting both single and multi-color lighting effects, as well as special effects such as random or sequential flashing, fading in and out, and so forth to be attained with a single panel. In addition, an on/off switch responsive to tilting or vibration of the backpack, or to a photosensor, can be included to provide additional special effects.

7 Claims, 4 Drawing Sheets

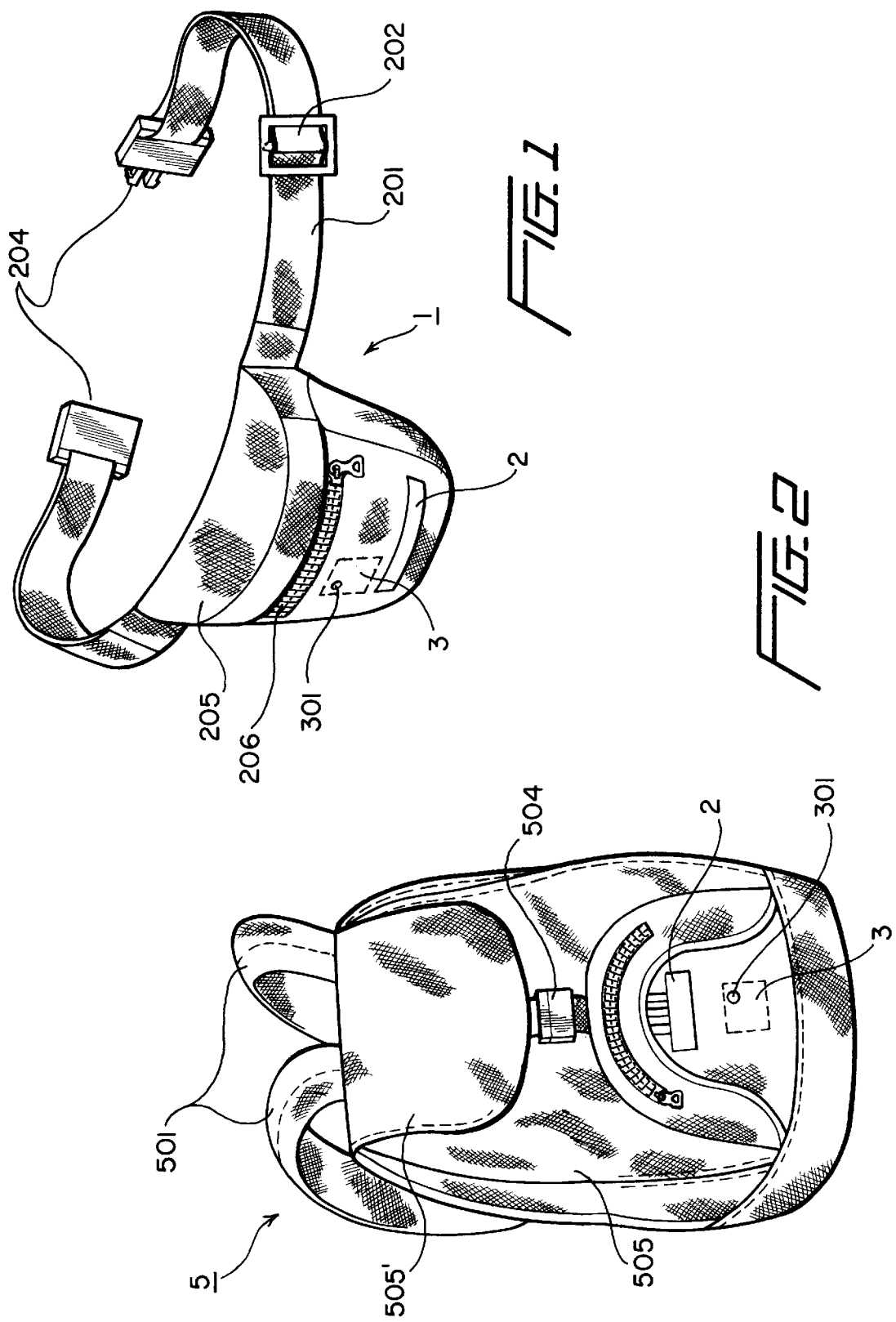

BACKPACK OR WAISTPACK E.L. LIGHTING ARRANGEMENT

This application is a Continuation of application Ser. No. 08/343,915, filed Nov. 17, 1994, now abandoned.

BACKGROUND OF THE INVENTION

1. Field of the Invention

This invention relates to a bag or case of the type having a strap arranged to be suspended from one or both shoulders of the user (referred to herein as a backpack) or wrapped around the waist of the user (referred to herein as a waistpack), and in particular to a bag or case of the above-mentioned type which includes an electro-luminescent light panel.

2. Discussion of Related Art

Backpacks (also known as knapsacks) and waistpacks popularly referred to as fanny packs) are soft bag-like containers which include straps to allow the wearer to carry a relatively heavy load for extended periods of time by distributing the weight of the load across the wearer's shoulders or waist while freeing the wearer's arms to carry out other tasks.

This type of bag or case is especially popular with students and hikers, who are often younger, more concerned with style, and less concerned with safety than their elders. As a result, it has been proposed to add lighting to the conventional backpack or waistpack for the purpose of enhancing safety while at the same time making the backpack or waistpack more attractive to potential users.

The main safety advantage is that the lighted pack is more visible to traffic under poor lighting conditions, thus decreasing the chance that an inattentive wearer will be struck by an automobile while crossing or walking alongside a road, while the attractiveness of the lighting serves to increase consumer interest and makes the consumer more likely to use the lighted pack than an unlighted one.

Conventional lighting arrangements for packs require either incandescent light sources or light emitting diodes (LEDs). However, incandescent light sources have the disadvantages of excessive weight, size, and power consumption, while light emitting diodes have an unacceptably narrow viewing angle and do not provide sufficient visibility, and thus neither type of lighting arrangement has attained widespread use. In addition, both LED and incandescent lighting arrangements require solid structural support, are relatively fragile, and are vulnerable to inclement weather conditions, making them unsuitable for packs of the above-mentioned type which conventionally have soft sides and are designed for outdoor use under all environmental conditions.

SUMMARY OF THE INVENTION

It is accordingly an objective of the invention to provide a lighted backpack or waistpack having a larger viewing angle and greater brightness than is possible with light emitting diode arrangements, for greater safety and attractiveness, but in which the lighting arrangement is less breakable, takes up less space, is lighter, uses less power, and is more versatile and attractive than a conventional incandescent lighting arrangement.

This objective is achieved, according to a preferred embodiment of the invention, by providing a backpack or waistpack in which the lighting medium is in the form of an electro-luminescent strip, and which includes a compact and lightweight power supply and control device made up of a DC power supply, a DC/AC converter electrically connected with the power supply, a transformer electrically connected to the DC/AC converter, an optional special effects unit electrically connected with the transformer, and a switch electrically connected between the transformer and the electro-luminescent light strip.

In an especially advantageous embodiment of the invention, the electro-luminescent light strip is in the form of a multi-element light panel of the type described in U.S. Pat. application Ser. No. 08/305,294, now U.S. Pat. No. 5,572,817 permitting both single and multi-color lighting effects, as well as special effects such as random or sequential flashing, fading in and out, and so forth to be attained with a single panel. In addition, an on/off switch responsive to tilting or vibration of the backpack, or to a photosensor, can be included to provide additional special effects.

The addition of such a lighting arrangement to an otherwise conventional backpack or waistpack (or other bag or case designed to be suspended from the body of the wearer by a strap) greatly increases the attractiveness of the backpack or waistpack, making the pack more fun to wear, while at the same time increasing the chance that the pack will attract the attention of motorists and prevent the wearer from being struck by an automobile.

BRIEF DESCRIPTION OF THE DRAWINGS

FIG. 1 is a perspective view of a first variation of the preferred embodiment, in which the pack is a waistpack.

FIG. 2 is a perspective view of a second variation of the preferred embodiment, in which the pack is a backpack.

DETAILED DESCRIPTION OF THE PREFERRED EMBODIMENTS

Figure 3:
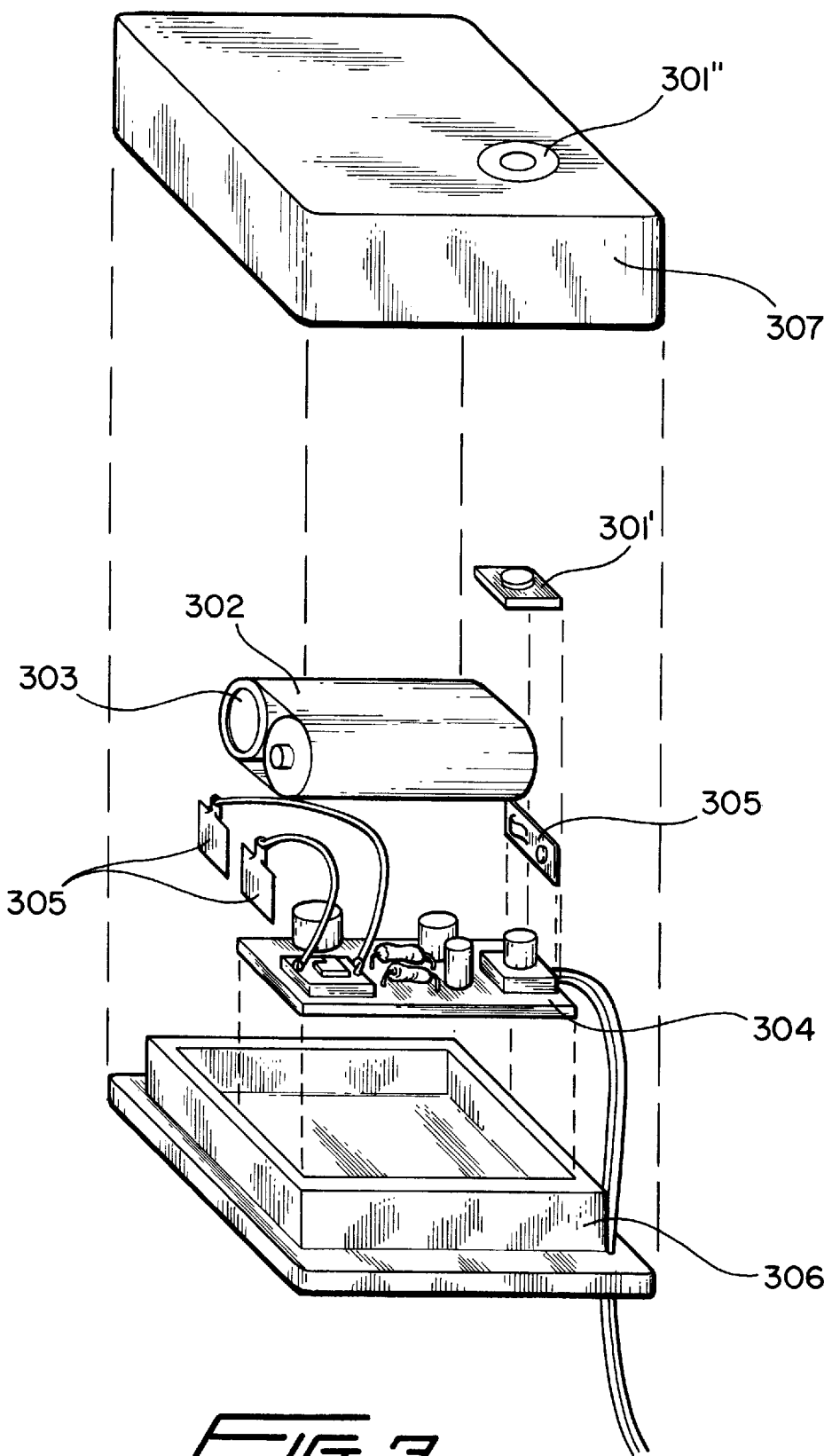
FIG. 3 is a functional block diagram showing details of the circuit for powering the electro-luminescent light panel of the preferred embodiment.

FIG. 1 shows a waistpack 1 to which is attached an electro-luminescent light strip 2, in accordance with the principles of a preferred embodiment of the invention. Waistpack 1 also includes a belt or strap 201 which in turn includes an adjustment bracket 202 for adjusting the length of the strap, and a buckle 204. The electro-luminescent light strip is attached to the exterior of a bag or case 205 made of a relatively soft natural or synthetic cloth-like material, such as canvas, nylon, or leather which includes a compartment for carrying a load, a zipper 206 for closing the compartment, and a control unit 3 which includes the power supply for the electro-luminescent strip, control circuitry, and a button 301. The power supply and control circuitry are shown in FIGS. 3–5.

FIG. 2 shows a backpack 5 to which is attached electro-luminescent light strip 2, in accordance with the principles of the preferred embodiment of the invention, and which includes a pair of straps 501 designed to be worn over the shoulders of the user, a bag or case 505 made of a relatively soft natural or synthetic cloth-like material, such as canvas, nylon, or leather which includes a compartment for carrying a load, a flap 501' for covering the compartment, a buckle 506 for securing the flap, and the above-mentioned control unit 3 which includes button 301.

Figure 6:
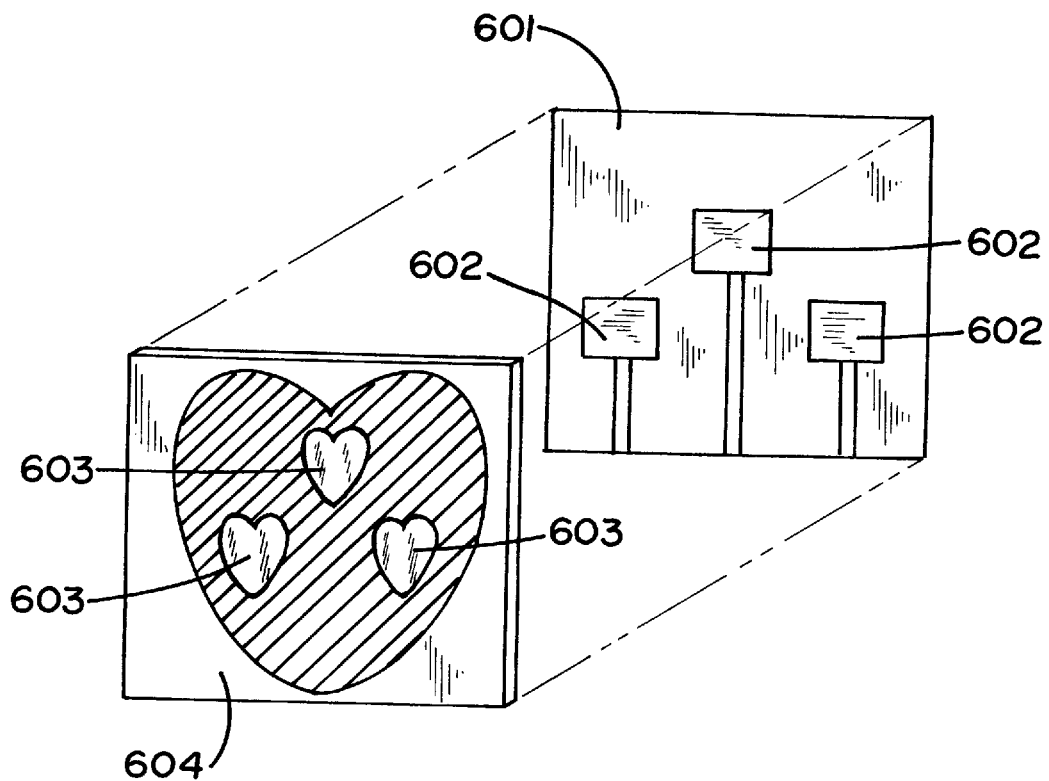
FIG. 6 is an exploded perspective view of an electro-luminescent panel with a pre-wired backsheet.

Light strip 2 in either the waistpack 1 of FIG. 1 or the backpack 5 of FIG. 2 may, for example, be in the form of a panel of the type described in U.S. Pat. application Ser. No. 08/305,294, which is made up, as illustrated in FIG. 6 of a pre-wired backsheet 601 on which are affixed discrete individual single-color electro-luminescent light panel segments 602, the electro-luminescent segments being capable of having different colors and arranged to shine through windows 603 of a protective covering 604 to therefore provide the capability of exhibiting multiple colors, patterns, and special effects such as motion or animation involving sequential turn on/off, chasing, or random fade-in/fade-out. Alternatively, the electro-luminescent light strip may be in the form of the improved single color light strip disclosed in U.S. Pat. application Ser. No. 08/156,004, which also provides high visibility, durability, and low cost. In the case of the single color strip, the strip 2 is preferably attached to the bag by putting the strip in an at least partially transparent flexible plastic sleeve or envelope similar to the sleeve formed by elements 601 and 604 illustrated in FIG. 6 secured to the bag by an adhesive such as glue, Velcro™, or double-sided tape, or by stitching. Preferably, the sleeve and the housing for the circuitry which powers the strip are waterproof and may include decorations in the form, for example, of light transparent or opaque silk-screen printing.

Figure 4:
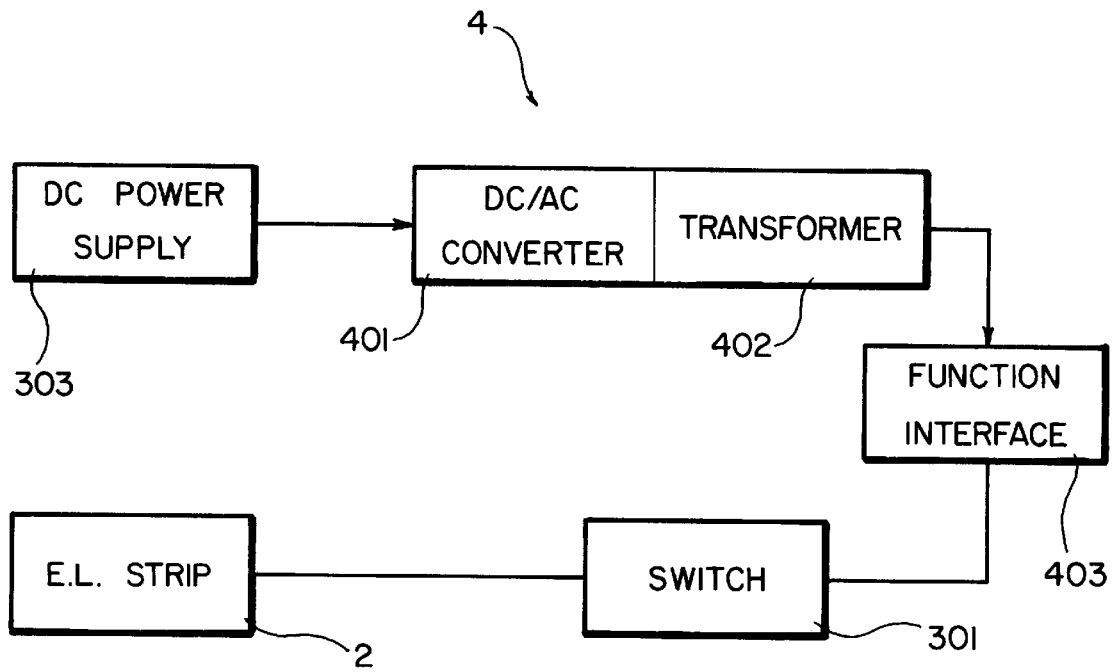
FIG. 4 is schematic diagram of the circuit shown in FIG. 3.
Figure 5:
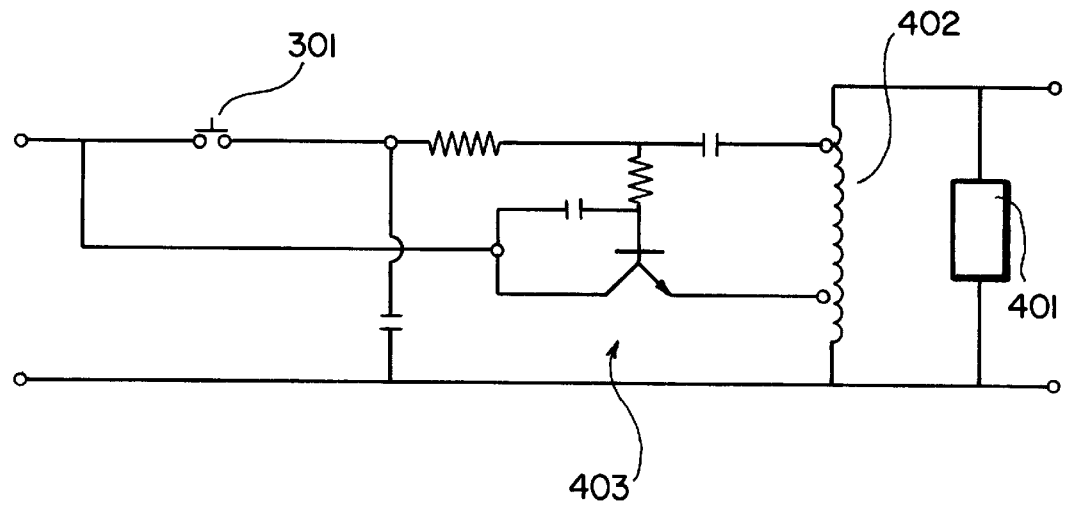
FIG. 5 is a perspective view of a control unit which includes the circuit of FIGS. 3 and 4.

Turning to FIG. 3, the control unit 3 used in both illustrated variations of the preferred embodiment preferably includes a power supply holder 302, DC power supply 303, circuit board 304 on which are mounted the components illustrated in FIGS. 4 and 5, electrodes 305 for connecting the circuitry with the DC power supply, a plastic base 306 with compartments for the DC power supply and circuit board, and a cover 307. Switch 301 is illustrated as being in the form of a pushbutton 301' mounted within the housing and accessible by pushing on a plastic membrane stretched across an opening in cover 307 in known fashion.

In the preferred embodiment, the DC power supply 303 is a dry cell battery which can easily be attached to the backpack or waistpack because of its small size and weight. In order to operate the electro-luminescent light panel, the DC current supplied by the battery must be converted to AC power and, consequently, as shown in FIGS. 4 and 5, the DC power source 303 is electrically connected to the electro-luminescent light strip 2 via a circuit 4 including a DC/AC converter 401 electrically connected with a transformer 402, transformer 402 being further electrically connected with a function interface 403 and, via parallel connected switch 301, with the electro-luminescent strip 2.

In operation, the direct current supplied by DC power source 303 is thus converted into an alternating current of a desired frequency by DC/AC converter 401 to the transformer 402 for increasing the voltage of the alternating current, and then transmitted from the transformer 402 to the function interface 403. Function interface 403 provides a number of preset or switchable options for turning on the electro-luminescent light strip 2, e.g., steady, flash, sequential or random, and may take any desired form from a simple flasher circuit illustrated in FIG. 5 to a microprocessor, depending on the complexity of the special effects to be exhibited. Those skilled in the art will appreciate that the number of options is greatly increased if a multiple element strip such as the one disclosed in the above-mentioned U.S. Pat. application Ser. No. 08/305,294 now U.S. Pat. No. 5,572,817 is utilized. Also, while the electro-luminescent light strip can be turned on and off by means of a manual push button switch 301, it may also be desired to include or substitute a photosensitive, vibration-sensitive, tilt-sensitive, or motion-sensitive switch to automatically turn the light on and off upon the occurrence of external events such as nightfall or various movements by the wearer.

Having thus described a specific preferred embodiments of the invention in terms which will enable those skilled in the art to make and use the invention, it will nevertheless be appreciated that numerous variations and modifications are possible within the scope of the invention. Consequently, it is intended that the invention not be limited by the above description or drawings, but rather that it be limited solely by the appended claims.

I claim:

1. A bag carried by a user via a belt or strap, comprising:

a lighting arrangement made up of an electro-luminescent strip, a power supply, and circuit means for supplying power from the power supply to the electro-luminescent strip, said lighting arrangement being affixed to the bag, wherein said power supply and circuit means are surrounded by a housing attached to the bag, said circuit means including at least one switch for turning the strip on and off, wherein the strip is sealed within a flexible protective sleeve attached to the bag by means selected from the group consisting of glue, Velcro™, double-sided tape, and stitching so as to conform to a shape of the bag, wherein the strap is a shoulder strap and the bag is a backpack, and wherein the strip includes a pre-wired electro-luminescent light panel having multiple discrete light emitting segments arranged on said panel to shine through a transparent area of the flexible protective sleeve.

2. A bag as claimed in claim 1, wherein the power supply is a DC power supply, and the circuit means includes means for converting DC current supplied by the power supply to an AC current and supplying the AC current to the electro-luminescent light strip.

3. A bag as claimed in claim 2, wherein the circuit means further comprises a function interface including means for causing the light to switch on and off according to a predetermined or random pattern.

4. A bag as claimed in claim 2, wherein the power supply is a dry cell battery.

5. A bag as claimed in claim 1, wherein the switch is a manual pushbutton switch.

6. A bag as claimed in claim 1, wherein the strap comprises means for adjusting a length of the strap and for securing the strap to the waist of a wearer.

7. A bag carried by a user via a belt or strap, comprising:

a lighting arrangement made up of an electro-luminescent strip, a power supply, and circuit means for supplying power from the power supply to the electro-luminescent strip, said lighting arrangement being affixed to the bag, wherein said power supply and circuit means are surrounded by a housing attached to the bag, said circuit means including at least one switch for turning the strip on and off, wherein the strip is sealed within a flexible protective sleeve attached to the bag by means selected from the group consisting of glue, Velcro™, double-sided tape, and stitching so as to conform to the shape of the bag, wherein the strap comprises means for adjusting a length of the strap and for securing the strap to the waist of a wearer, and wherein the strip includes a pre-wired electro-luminescent light panel having multiple discrete light emitting segments arranged on said panel to shine through a transparent area of the flexible protective sleeve.

\* \* \* \* \*